US008508521B2

(12) United States Patent
Huh et al.

(10) Patent No.: US 8,508,521 B2
(45) Date of Patent: Aug. 13, 2013

(54) METHOD OF DRIVING DISPLAY PANEL AND DISPLAY APPARATUS USING THE SAME

(75) Inventors: Jong-Moo Huh, Hwaseong-si (KR); Je-Hun Lee, Seoul (KR)

(73) Assignee: Samsung Display Co., Ltd. (KR)

( * ) Notice: Subject to any disclaimer, the term of this patent is extended or adjusted under 35 U.S.C. 154(b) by 542 days.

(21) Appl. No.: 12/561,155

(22) Filed: Sep. 16, 2009

(65) Prior Publication Data

US 2010/0066724 A1 Mar. 18, 2010

(30) Foreign Application Priority Data

Sep. 17, 2008 (KR) ........................ 10-2008-0091222

(51) Int. Cl.
*G06F 3/038* (2006.01)

(52) U.S. Cl.
USPC ............ 345/211; 345/213; 345/214; 345/204

(58) Field of Classification Search
USPC ...... 345/76, 204, 214, 213, 211, 82; 359/296
See application file for complete search history.

(56) References Cited

U.S. PATENT DOCUMENTS

| | | | | |
|---|---|---|---|---|
| 7,551,164 | B2 * | 6/2009 | Deane | 345/204 |
| 7,898,511 | B2 * | 3/2011 | Yoo | 345/82 |
| 2006/0208971 | A1 * | 9/2006 | Deane | 345/76 |
| 2008/0174574 | A1 * | 7/2008 | Yoo | 345/204 |
| 2008/0239460 | A1 * | 10/2008 | Shimizu et al. | 359/296 |
| 2008/0284691 | A1 * | 11/2008 | Chung et al. | 345/76 |
| 2009/0128534 | A1 * | 5/2009 | Fish et al. | 345/211 |
| 2011/0122124 | A1 * | 5/2011 | Kimura et al. | 345/214 |

FOREIGN PATENT DOCUMENTS

| | | | |
|---|---|---|---|
| JP | 2003-037273 | A | 2/2003 |
| KR | 1020030002426 | A | 1/2003 |
| KR | 1020060076147 | A | 7/2006 |
| KR | 1020070045750 | A | 5/2007 |

* cited by examiner

*Primary Examiner* — Thuy Pardo
(74) *Attorney, Agent, or Firm* — Innovation Counsel LLP

(57) ABSTRACT

Disclosed are a method of driving a display panel and a display apparatus using the same, in which a driving voltage is applied to a transistor provided in each pixel of the display to drive the transistor. A voltage level of the driving voltage applied to the transistor is adjusted every predetermined period and the changed driving voltage is applied to the transistor to prevent the operational reliability of the transistor from being lowered by a shift in the threshold voltage of the transistor.

15 Claims, 10 Drawing Sheets

METHOD OF DRIVING DISPLAY PANEL AND DISPLAY APPARATUS USING THE SAME

CROSS-REFERENCE TO RELATED APPLICATION

This application relies for priority upon Korean Patent Application No. 2008-91222 filed on Sep. 17, 2008, the contents of which are herein incorporated by reference in their entirety.

BACKGROUND

1. Field of the Invention

The present invention relates to a method of driving a display panel and a display apparatus using the same. More particularly, the present invention relates to a method of driving a display panel having a transistor including an oxide semiconductor and a display apparatus using the same.

2. Description of the Related Art

In general, a flat panel display includes a substrate, a plurality of thin film transistors provided on the substrate and pixel electrodes that are each electrically connected to a thin film transistor.

A thin film transistor includes semiconductor materials that become a conductor under a predetermined condition to act as a switch for a data signal provided to the pixel electrode. Silicon is widely used as the semiconductor material. Organic semiconductors and oxide semiconductors are also used as the semiconductor material in a flat panel display.

In particular, an oxide semiconductor includes Indium Gallium Zinc Oxide (In—Ga—Zn—O) based materials, and the composition of elements constituting the oxide semiconductor is adjusted to provide the oxide semiconductor with characteristics of a semiconductor. Since an oxide semiconductor has superior electric mobility as compared with silicon-based semiconductor, using an oxide semiconductor improves the switching characteristic of the thin film transistor. Therefore, oxide semiconductors are extensively used in thin film transistors.

However, the use of an oxide semiconductor can cause a shift in the threshold voltage, and lower the driving reliability of the display apparatus.

SUMMARY

An exemplary embodiment of the present invention provides a method of driving a display panel to improve reliability of a transistor including an oxide semiconductor.

Another exemplary embodiment of the present invention provides a display apparatus employing the above driving method.

In an exemplary embodiment of the present invention, a method of driving a display panel is provided as follows. A driving voltage is applied to a transistor provided in each pixel of the display panel to drive the transistor. A level of the driving voltage applied to the transistor is changed every predetermined period and the changed driving voltage is applied to the transistor, thereby compensating for a shift in the threshold voltage of the transistor.

In another exemplary embodiment of the present invention, a method of driving a display apparatus is provided as follows. When a display panel having a plurality of pixels each provided with at least one transistor is prepared, a voltage stress is applied to the transistor to a threshold voltage of the transistor. A normal driving voltage is applied to the transistor such that the transistor is driven.

In another exemplary embodiment of the present invention, a display apparatus includes a display panel, a gate driver, a data driver and a compensation circuit. The display panel has a plurality of pixels provided with at least one transistor, and displays an image by receiving a gate voltage and a data voltage. The gate driver receives a gate-on voltage and a gate-off voltage to provide the gate voltage to a gate electrode of the transistor. The data driver provides the data voltage to a source electrode of the transistor. The compensation circuit outputs a comparison signal every predetermined period to reduce the gate-on voltage and the gate-off voltage to compensate for a shifted threshold voltage of the transistor.

According to the above, a level of a turn-on voltage and a turn-off voltage applied to a transistor, changes after a predetermined period, to prevent operational reliability of the transistor from being lowered due to a shifted threshold voltage of the transistor.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE EMBODIMENTS

Hereinafter, embodiments of the present invention will be described in detail with reference to accompanying drawings.

Figure 1:
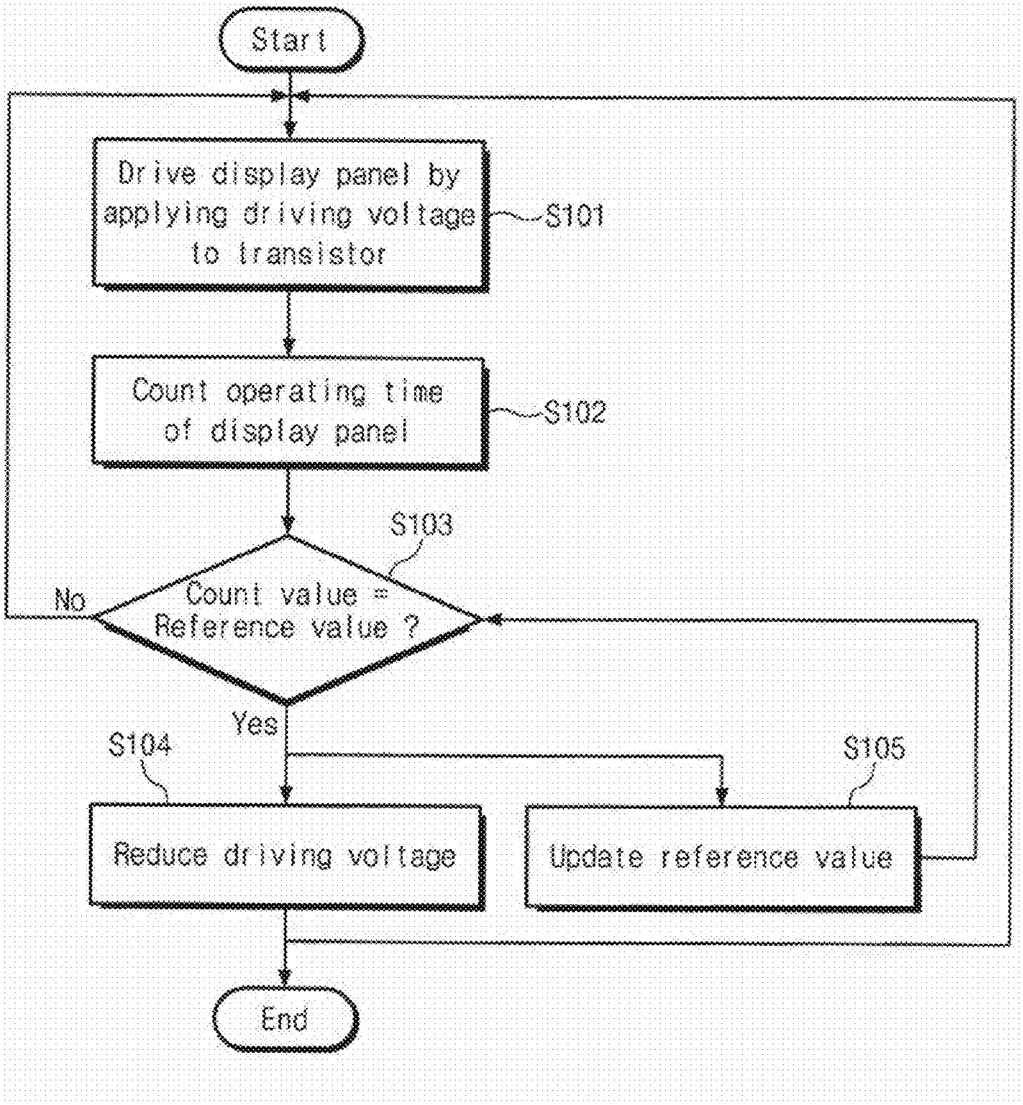
FIG. 1 is a flowchart showing a method of driving a display panel according to an exemplary embodiment of the present invention.
Figure 2:
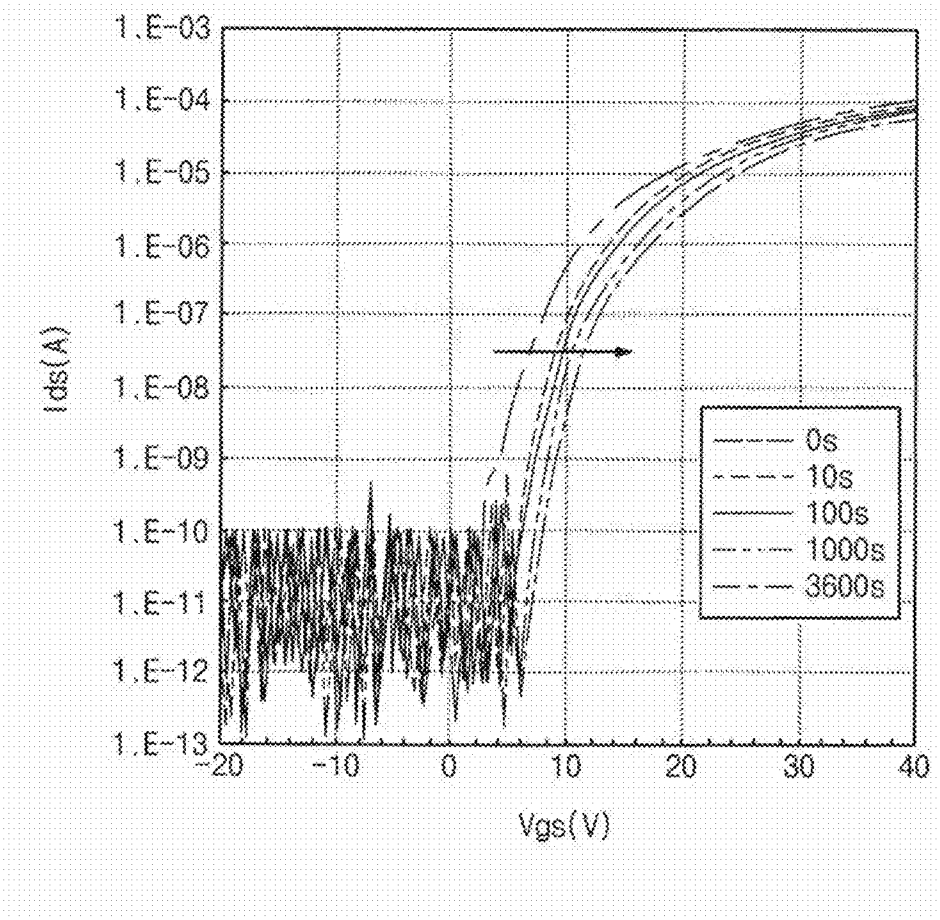
FIGS. 2 and 3 are graphs showing a shift in a transistor threshold voltage over time.
Figure 3:
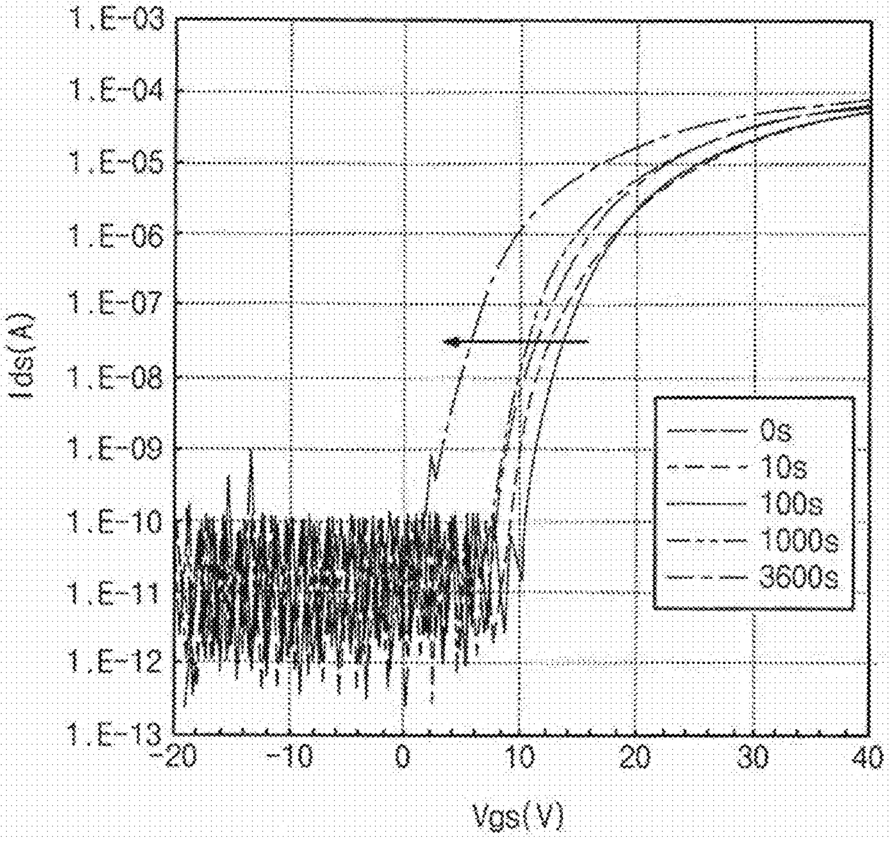

FIG. 1 is a flowchart showing a method of driving a display panel according to an exemplary embodiment of the present invention. FIGS. 2 and 3 are graphs showing a shift in threshold voltage shifted over time.

Referring to FIG. 1, at least one transistor is provided in each pixel of a display panel. The transistor is provided to switch signals provided from an external source. The transistor is turned on or turned off in response to a driving voltage. According to the present invention, the transistor includes an oxide semiconductor and the oxide semiconductor includes Indium Gallium Zinc Oxide (IGZO: In—Ga—Zn—O) based materials.

First, a driving voltage is applied to the transistor to drive the display panel (S101). Then, an operating time of the display panel is counted (S102). After that, the count value is compared with a preset reference value (S103) to determine whether the count value matches the reference value. If the two values are different from each other, the driving voltage is not changed. Accordingly, the initial driving voltage is applied to the transistor.

If the count value matches the reference value, the driving voltage is reduced by a preset reference voltage (S104). The driving voltage includes a turn-on voltage to turn on the transistor and a turn-off voltage to turn off the transistor. If the count value matches the reference value, the turn-on voltage and the turn-off voltage are reduced by the reference voltage.

As an example of the present invention, the reference value corresponds to 1000 hours and the reference voltage is 1V. Accordingly, if the turn-on voltage and the turn-off voltage are 20V and −5V, respectively, in an early stage of operation, the turn-on voltage and the turn-off voltage are reduced to 19V and −6V, respectively, after the operating time of 1000 hours has lapsed.

Furthermore, if the count value matches the reference value, the reference value is updated (S105). For example, the reference value can be updated into a value corresponding to 2000 hours. The updated reference value is compared with the count value in step S103.

In FIGS. 2 and 3, the X axis represents a gate-source voltage Vgs and the Y axis represents a source-drain current Ids. FIG. 2 is a graph representing a threshold voltage that varies with time when a voltage of 20V is applied to a gate electrode of the transistor and a voltage of 0.1V is applied to a drain electrode. FIG. 3 is a graph representing a threshold voltage which varies with time when a voltage of −20V is applied to the gate electrode of the transistor and a voltage of 10V is applied to the drain electrode.

As shown in FIG. 2, if a voltage having positive polarity is applied to the gate electrode of the transistor for a long period of time, the threshold voltage of the transistor increases. However, as shown in FIG. 3, a voltage having negative polarity is applied to the gate electrode of the transistor for a long period of time, the threshold voltage of the transistor decreases.

When the display panel is driven, since the negative voltage is applied to the gate electrode of the transistor for a long period of time, the threshold voltage of the transistor is shifted down with time.

Accordingly, the operating time of the display panel is counted, and the driving voltage provided to the transistor is reduced according to the count value. Therefore, even if the threshold voltage of the transistor is shifted, the operational reliability of the transistor is maintained.

Figure 4:
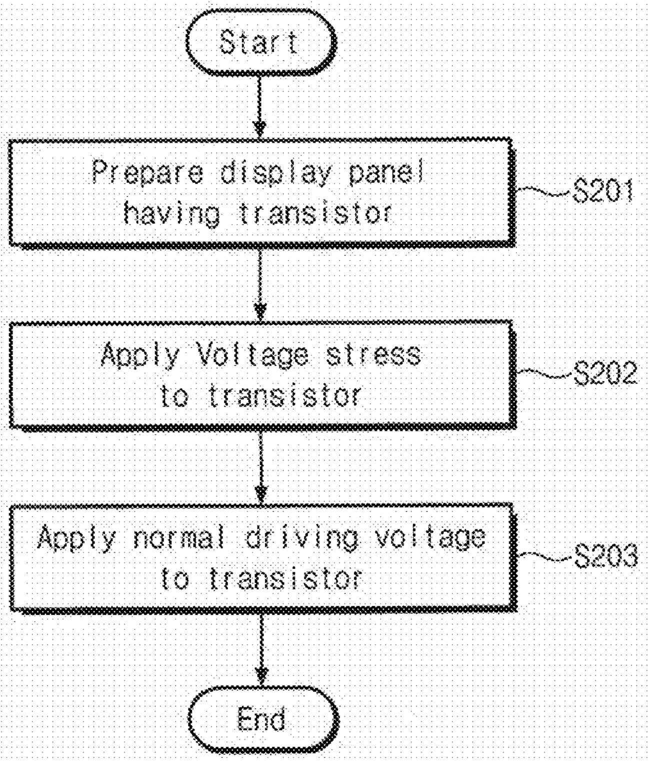
FIG. 4 is a flowchart showing a method of driving a display panel according to another exemplary embodiment of the present invention.

FIG. 4 is a flowchart showing a method of driving a display panel according to another exemplary embodiment of the present invention.

Referring to FIG. 4, a display panel provided with a plurality of pixels each connected to at least one transistor is prepared (S201). The transistor may include the oxide semiconductor, and the oxide semiconductor may include Indium Gallium Zinc Oxide (IGZO) based materials.

Then, a voltage stress is applied to the transistor to saturate the threshold voltage of the transistor (S202). After that, a normal driving voltage is applied to the transistor to drive the transistor (S203).

The normal driving voltage includes the turn-on voltage to turn on the transistor and the turn-off voltage to turn off the transistor. A voltage level lower than that of the turn-off voltage is applied for a predetermined time to apply voltage stress to the transistor.

For example, a stress voltage having a level of −10 or below may be applied to a gate electrode of the transistor for about 30 minutes or more at the temperature of 60° C. or higher.

Figure 5:
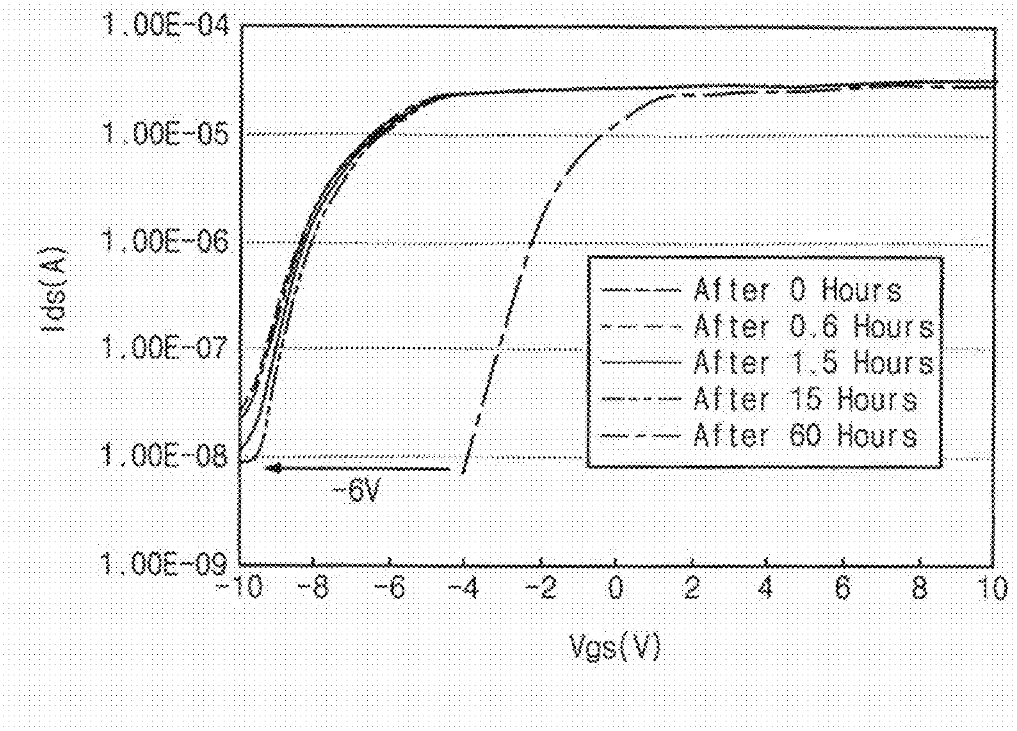
FIG. 5 is a graph showing a threshold voltage shift over time under a voltage stress condition.
Figure 6:
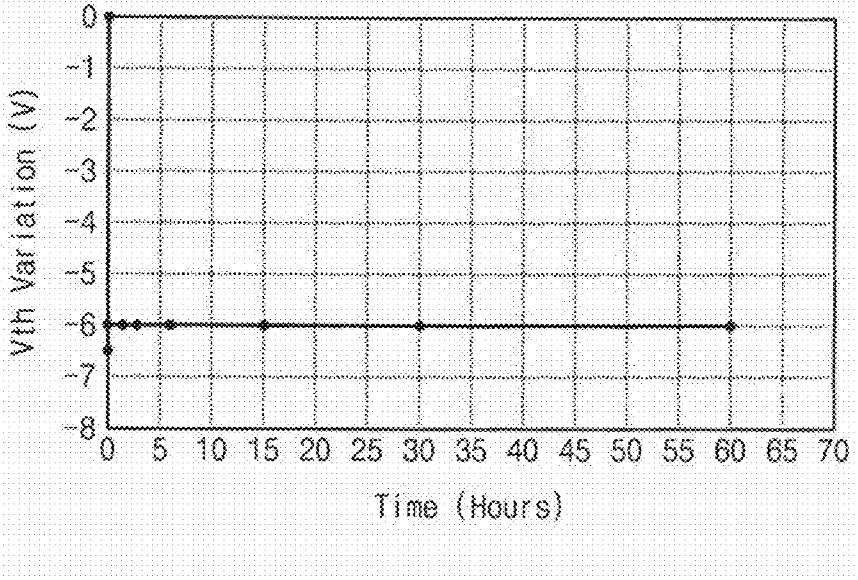
FIG. 6 is a graph showing a threshold voltage variation over time.

FIG. 5 is a graph showing a threshold voltage shift over time under a voltage stress condition. FIG. 6 is a graph showing threshold voltage variation over time. In FIGS. 5 and 6, the voltage stress condition is created by applying a voltage of −20V and a voltage of 10V to the gate electrode and a drain electrode of the transistor, respectively, at the temperature of 60° C.

Referring to FIGS. 5 and 6, when the voltage stress is not applied to the transistor, the threshold voltage is −4V. When the voltage stress is applied for about 0.6 hours, the threshold voltage of the transistor is reduced to about −10V from about −4V. After the operating time exceeds 0.6 hours, the threshold voltage of the transistor does not change significantly and has a constant level of about −10V. That is, the threshold voltage of the transistor is stabilized.

Accordingly, if the display panel is normally driven after the voltage stress has been applied to the transistor in the display panel, the threshold voltage of the transistor does not shift significantly, and the operational reliability of the transistor is improved.

Figure 7:
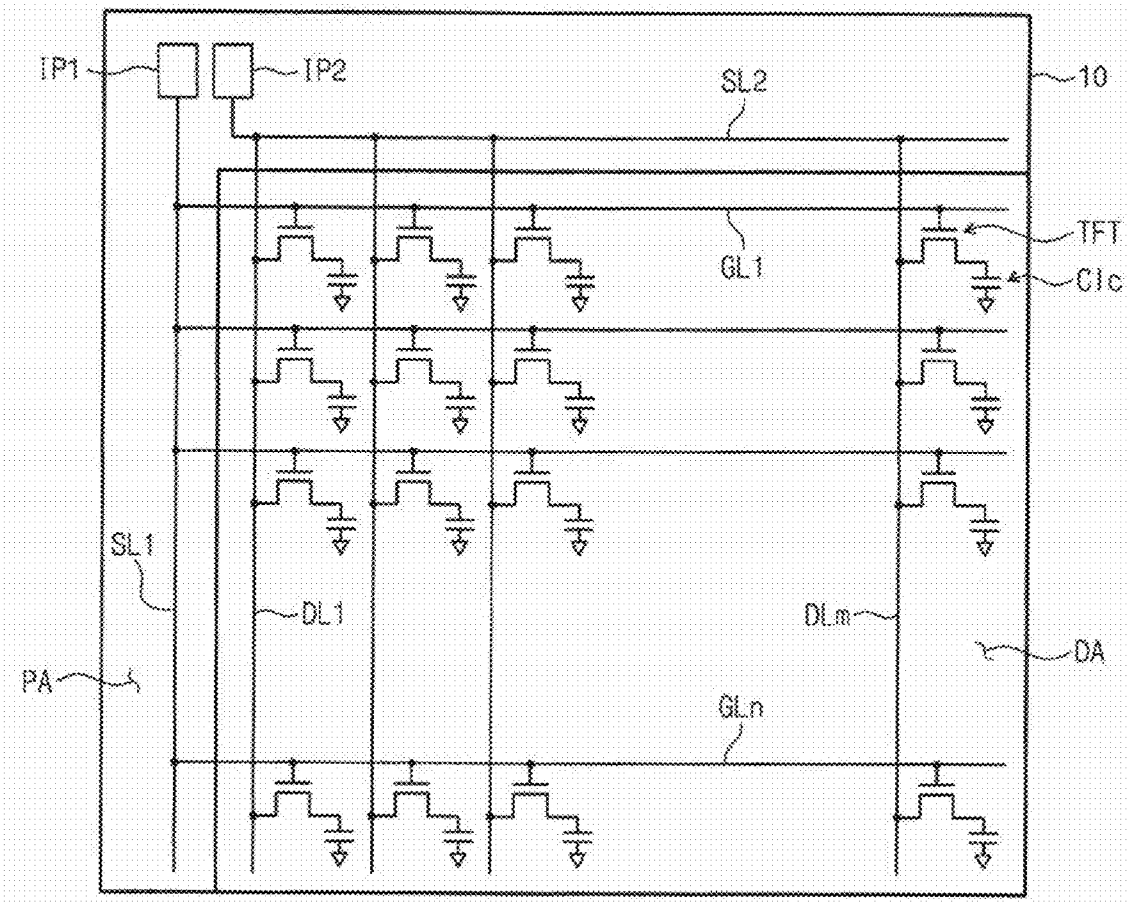
FIGS. 7 and 8 are equivalent circuit diagrams showing a display panel adapted for the method of applying a voltage stress shown in FIG. 4.
Figure 8:
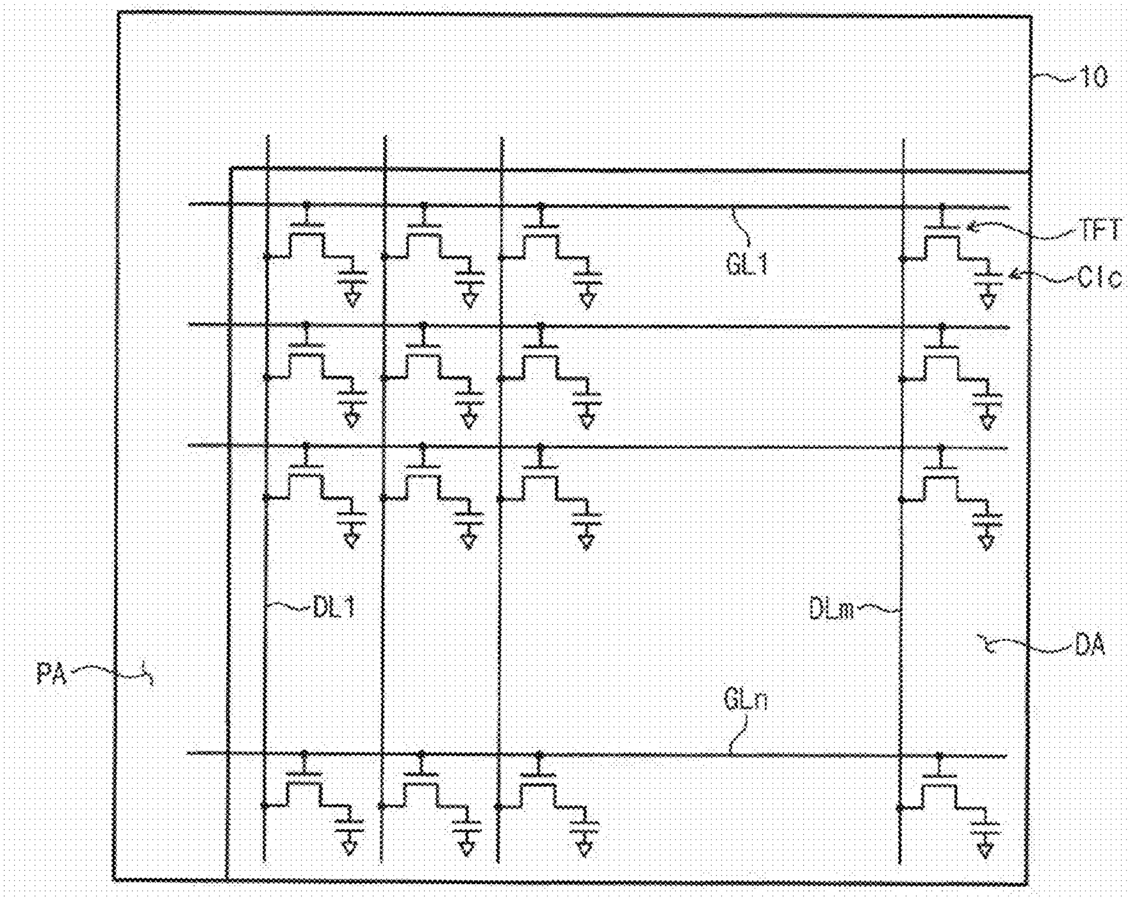

FIGS. 7 and 8 are equivalent circuit diagrams showing a display panel adapted for the method of applying voltage stress shown in FIG. 4.

Referring to FIGS. 7 and 8, a display panel 10 is divided into a display area DA which displays images and a peripheral area of PA adjacent to the display area DA. A plurality of gate lines GL1 to GLn, which are spaced apart from each other by a predetermined interval, and a plurality of data lines DL1 to DLm, which are spaced apart from each other by a predetermined interval, are provided in the display area DA. The gate lines GL1 to GLn are insulated from the data lines DL1 to DLm and crosses the data lines DL1 to DLm. A plurality of pixel areas are disposed at the cross of the gate lines and the data lines in the form of a matrix. A pixel is provided in each pixel area, and the pixel includes a transistor TFT and a liquid crystal capacitor Clc. The transistor TFT may include an oxide semiconductor. The oxide semiconductor may include Indium Gallium Zinc Oxide (IGZO) based materials.

Although the present exemplary embodiment has been described in that the display panel 10 is a liquid crystal display panel as shown in FIGS. 7 and 8, the present invention is not limited thereto. According to another exemplary embodiment, the display panel may be an organic light emitting diode display panel.

Referring to FIG. 7, in order to apply voltage stress to the transistor TFT provided in the pixel, the gate lines GL1 to GLn are electrically connected to each other through a first shorting line SL1, and the data lines DL to DLm are electrically connected to each other through a second shorting line SL2. A first input pad IP1 and a second input pad IP2 are provided on an end of the first and second shorting lines SL1 and SL2, respectively. Accordingly, the first and second shorting lines SL1 and SL2 receive the stress voltage through the first and second input pads IP1 and IP2, respectively, to apply the stress voltage to the transistor TFT provided on the display panel 10.

After the voltage stress process is completed, the threshold voltage of the transistor TFT is saturated. After that, the first and second shorting lines SL1 and SL2 are removed from the display panel 10 as shown in FIG. 8 to allow the display panel 10 to operate normally. In the present exemplary embodiment, the first and second shorting lines SL1 and SL2 are removed through a grinding process. When the shorting lines are removed, the gate lines GL1 to GLn are electrically insulated from each other, and the data lines DL1 to DLm are also electrically insulated from each other on the display panel 10.

Voltage stress can be applied to the transistor TFT through various schemes in addition to the scheme shown in FIGS. 7 and 8.

Figure 9:
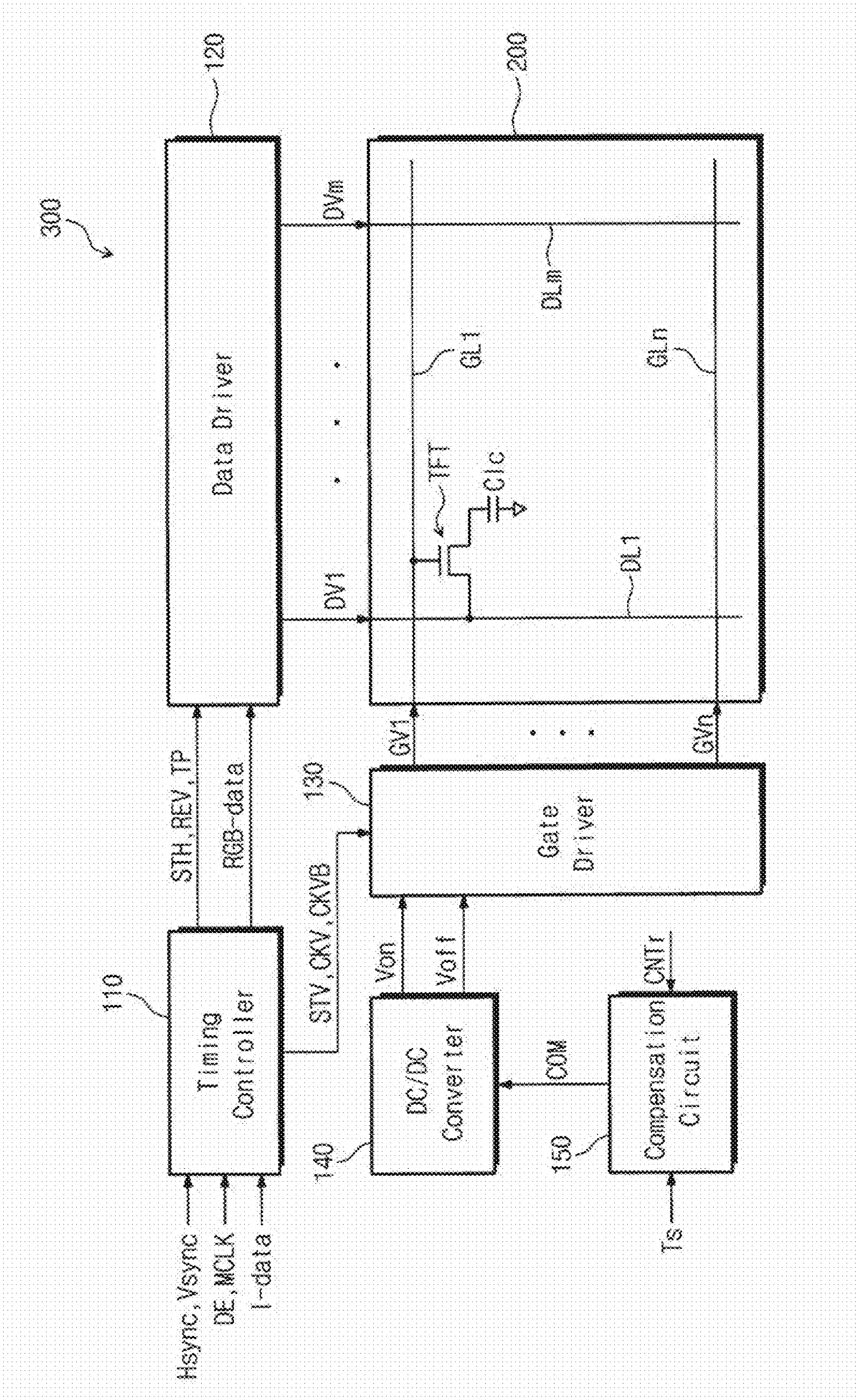
FIG. 9 is a block diagram showing a display apparatus according to an exemplary embodiment of the present invention.

FIG. 9 is a block diagram showing a display apparatus according to another exemplary embodiment of the present invention.

Referring to FIG. 9, a display apparatus 300 includes a timing controller 110, a data driver 120, a gate driver 130, a direct current/direct current converter (hereinafter, referred to as a DC/DC converter) 140, a compensation circuit 150, and a liquid crystal display panel 200.

The timing controller 110 receives a data enable signal DE, a vertical synchronization signal Vsync, a horizontal synchronization signal Hsync, a main clock signal MCLK, and an image data I-data from an external source. The timing controller 110 converts the image data I-data into red, green and blue data RGB-data and then provides the red, green and blue data RGB-data to the data driver 120. The timing controller 110 generates a data control signal (including STH, REV, and TP) and a gate control signal (including STV, CKW, and CKVB) using the data enable signal DE, the main clock signal MCLK, and the vertical and horizontal synchronization signals Vsync and Hsync, and then outputs the data control signal and the gate control signal to the data driver 120 and the gate driver 130, respectively.

The data driver 120 receives the data control signal and red, green and blue data RGB-data from the timing controller 110 to output a plurality of data voltages DV1 to DVm. The data control signal includes a horizontal start signal STH, a reversal signal REV, and an output start signal TP. The horizontal start signal STH is used to start the operation of the data driver 120, the reversal signal REV is used to reverse polarity of the data voltages DV1 to DVm, and the output start signal TP is used to determine output time of the data voltages DV1 to DVm.

The gate driver 130 outputs a plurality of gate voltages GV1 to GVn in response to the gate control signal. The gate control signal includes a vertical start signal STV, a first clock signal CKV and a second clock signal CKVB; The vertical start signal STV is used to start the operation of the gate driver 130, and the first and second clock signals CKV and CKVB are used to determine a high-level section of the gate voltages GV1 to GVn.

The gate driver 130 receives a gate-on voltage Von and a gate-off voltage Voff from the DC/DC converter 140. The level of the gate voltages GV1 to GVn outputted from the gate driver 130 is determined according to the gate-on voltage Von and the gate-off voltage Voff. The gate voltages GV1 to GVn have a level corresponding to that of the gate-on voltage Von during a horizontal scanning period in a single frame, and have a level corresponding to that of the gate-off voltage Voff during the remaining time in that frame.

The high-level section is defined as a section in which the gate voltages GV1 to GVn have the level of the gate-on voltage Von. The high section sequentially occurs in the gate voltages GV1 to GVn by the first and second clock signals CKV and CKVB.

The liquid crystal display 200 shown in FIG. 9 has the same structure as that of the display panel 10 shown in FIG. 8. Accordingly, the detailed description of the liquid display panel 200 is omitted.

The data driver 120 is electrically connected to the data lines DL1 to DLm provided on the liquid crystal display panel 200, and the gate driver 130 is electrically connected to the gate lines GL1 to GLn provided on the liquid crystal display panel 200.

The gate driver 130 applies the gate voltages GV1 to GVn to the gate lines GL1 to GLn, respectively. The transistor TFT connected to each of the gate lines GL1 to GLn in the high-level section of the gate voltages GV1 to GVn is turned on, and the data voltages DV1 to DVm, which are provided from the data driver 120 through the activated transistor TFT, are inputted to the liquid crystal capacitors Clc to display images corresponding to the data voltages DV1 to DVm.

As described above, the transistors TFT are turned on by the gate-on voltage Von during the horizontal scanning period of the frame, and turned off by the gate-off voltage Voff during the remaining frame. When the liquid crystal display 200 is driven for a long period of time, the threshold voltage of the transistors TFT shifts down.

Accordingly, the display apparatus 300 may further include the compensation circuit 150 that compensates for the threshold voltage. Since the threshold voltage changes according to the operating time of the liquid crystal display panel 200, the compensation circuit 150 compensates for the threshold voltage based on the operating time of the liquid crystal display panel 200.

Figure 10:
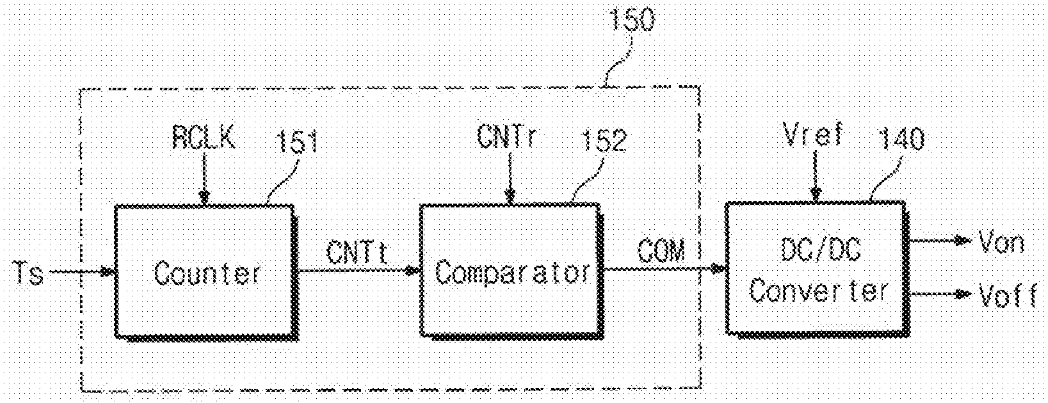
FIG. 10 is a block diagram showing a compensation circuit shown in FIG. 9.
Figure 11:
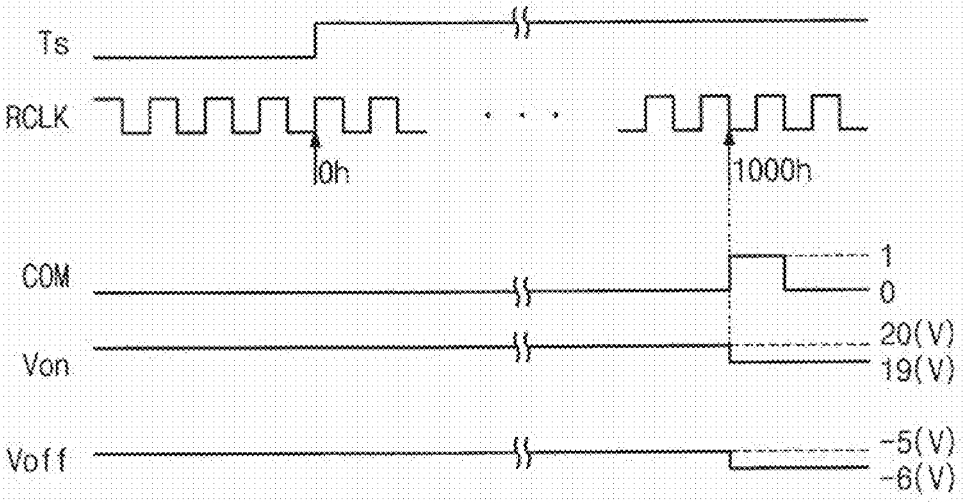
FIG. 11 is a timing chart showing waveforms of signals shown in FIG. 10.

FIG. 10 is a block diagram showing details of the compensation circuit shown in FIG. 9. FIG. 11 is a timing chart showing waveforms of signals shown in FIG. 10.

Referring to FIGS. 10 and 11, the compensation circuit 150 includes a counter 151 and a comparator 152. The counter 151 receives a preset reference clock RCLK and a signal Ts that notifies the operating time of the liquid crystal display 200. The counter 151 counts the signal Ts based on the reference clock RCLK.

The count value CNTt is provided to the comparator 152, and the comparator 152 compares the count value CNTt with a preset reference value CNTr. In detail, the comparator 152 determines whether the count value CNTt matches the reference value CNTr. If the count value CNTt does not match the reference value CNTr, a comparison signal COM of '0' is outputted. If the count value CNTt matches the reference value CNTr, a comparison signal COM of '1' is outputted.

The comparison signal COM is provided to the DC/DC converter 140. The DC/DC converter 140 controls the voltage level of the gate-on voltage Von and the gate-off voltage Voff based on the comparison signal. In detail, if the comparison signal COM is '0', the DC/DC converter 140 does not change the level of the gate-on voltage Von and the gate-off voltage Voff. However, if the comparison signal is '1', the DC/DC converter 140 drops the gate-on voltage Von and the gate-off voltage Voff by a preset reference voltage Vref.

For example, if the reference value CNTr corresponds to 1000 hours, the reference voltage Vref is 1V, and the gate-on voltage Von and the gate-off voltage Voff are 20V and −5V, respectively, in the early stage of the operation of the display panel, after 1000 hours of operation, the gate-on voltage Von and the gate-off voltage Voff outputted from the DC/DC converter 140 are reduced by 1V to 19V and −6V, so that the shifted threshold voltages of the transistor can be compensated.

In the present exemplary embodiment, the reference voltage Vref is set based on the amount of threshold voltage shift during a time period corresponding to the reference value CNTr.

As described above, the gate-on voltage Von and the gate-off voltage Voff are changed after a predetermined time, thereby preventing the operational reliability of the transistor TFT from being lowered due to the shift of the threshold voltage of the transistor TFT.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A method of driving a display panel, the method comprising:

applying a first driving voltage to a gate electrode of a transistor provided in a pixel of the display panel to display an image;

counting an operating time of the display panel to measure a count value;

comparing the count value with a preset reference value;

outputting a comparison signal when the count value matches the preset reference value;

generating a second driving voltage based on the comparison signal;

applying the second driving voltage to the gate electrode of a transistor in the pixel of the display panel to display the image, wherein the second driving voltage is applied to the gate electrode of the transistor after a predetermined operating time period and a shift in a threshold voltage of the transistor is compensated by the second driving voltage.

2. The method of claim 1, wherein the second driving voltage is reduced by a preset reference voltage when the count value matches the preset reference value.

3. The method of claim 2, wherein the second driving voltage comprise a turn-on voltage to turn on the transistor and a turn-off voltage to turn off the transistor, and the turn-on voltage and the turn-off voltage are reduced by the preset reference voltage when the count value matches the reference value.

4. The method of claim 3, wherein the counting an operating time of the display panel to measure the count value comprises, counting a signal that notifies the operating time of the liquid crystal display based on the reference clock.

5. The method of claim 4, wherein an amount of the reduced voltage of the turn-on voltage and the turn-off voltage is same.

6. The method of claim 3, wherein an amount of the reduced voltage of the turn-on voltage and the turn-off voltage is same.

7. The method of claim 1, wherein the transistor comprises an oxide semiconductor.

8. The method of claim 7, wherein the oxide semiconductor comprises Indium Gallium Zinc Oxide (In—Ga—Zn—O) based materials.

9. The method of claim 1, wherein the measuring an operating time of the display panel to measure the count value comprises, counting a signal that notifies the operating time of the liquid crystal display based on the reference clock.

10. The method of claim 1, further comprising updating the reference value when the count value matches the reference value.

11. A display apparatus comprising:

a display panel having a plurality of pixels each provided with at least one transistor to display an image in response to a gate voltage and a data voltage;

a gate driver providing a gate-voltage to a gate electrode of the transistor;

a data driver providing the data voltage to a source electrode of the transistor; and a compensation circuit configured to compensate for a threshold voltage shift of the transistor by changing the gate voltage of the transistor to display the image, wherein the compensation circuit comprises, a counter counting an operating time of the display panel, and a comparator comparing a count value provided from the counter with a preset reference value and outputting a comparison signal when the count value matches the reference value.

12. The display apparatus of claim 11, further comprising a DC/DC converter of generating the gate voltage based on the comparison signal.

13. The display apparatus of claim 12, wherein the DC/DC converter reduces the gate voltage by a preset reference voltage when the count value matches the reference value.

14. The display apparatus of claim 11, wherein the transistor comprises an oxide semiconductor.

15. The display apparatus of claim 14, wherein the oxide semiconductor comprises Indium Gallium Zinc Oxide (In—Ga—Zn—O) based materials.

* * * * *